United States Patent
Nabeto et al.

(10) Patent No.: US 12,109,683 B2
(45) Date of Patent: Oct. 8, 2024

(54) TACTILE SENSOR, ROBOT HAND, AND ROBOT

(71) Applicant: OMRON Corporation, Kyoto (JP)

(72) Inventors: Misato Nabeto, Kyoto (JP); Sayaka Doi, Joyo (JP); Hiroki Koga, Nara (JP)

(73) Assignee: OMRON CORPORATION, Kyoto (JP)

( * ) Notice: Subject to any disclaimer, the term of this patent is extended or adjusted under 35 U.S.C. 154(b) by 323 days.

(21) Appl. No.: 17/615,449

(22) PCT Filed: Jun. 6, 2019

(86) PCT No.: PCT/JP2019/022639
§ 371 (c)(1),
(2) Date: Nov. 30, 2021

(87) PCT Pub. No.: WO2020/246008
PCT Pub. Date: Dec. 10, 2020

(65) Prior Publication Data
US 2022/0227006 A1    Jul. 21, 2022

(51) Int. Cl.
*B25J 13/08*    (2006.01)
*B25J 15/08*    (2006.01)
*G01L 5/22*    (2006.01)

(52) U.S. Cl.
CPC ............ *B25J 13/084* (2013.01); *B25J 15/08* (2013.01); *G01L 5/226* (2013.01)

(58) Field of Classification Search
CPC ........ B25J 13/084; B25J 15/08; B25J 13/082; G01L 5/226
See application file for complete search history.

(56) References Cited

U.S. PATENT DOCUMENTS

| | | | |
|---|---|---|---|
| 2009/0285664 A1* | 11/2009 | Kim | B25J 9/1612 414/730 |
| 2010/0156127 A1 | 6/2010 | De Kervanoael | |
| 2010/0292707 A1* | 11/2010 | Ortmaier | B25J 19/0075 606/130 |
| 2018/0215054 A1* | 8/2018 | Brudniok | B25J 19/02 |
| 2020/0139543 A1 | 5/2020 | Saito | |
| 2020/0171677 A1* | 6/2020 | Endo | B25J 15/10 |

FOREIGN PATENT DOCUMENTS

| | | | |
|---|---|---|---|
| CN | 206114162 U | 4/2017 | |
| EP | 2402513 A1 * | 1/2012 | ............ B25J 9/1674 |
| JP | S53-7071 A | 1/1978 | |

(Continued)

OTHER PUBLICATIONS

Extended European Search Report issued in corresponding European Patent Application No. 19932180.3 dated Dec. 8, 2022.

(Continued)

*Primary Examiner* — Francis C Gray
(74) *Attorney, Agent, or Firm* — Morgan, Lewis & Bockius LLP

(57) ABSTRACT

A tactile sensor pertaining to the present disclosure includes a cover that is provided so as to cover at least part of a base portion, a detection unit that is disposed between the cover and the base portion and detects force applied to the cover, and a limiting structure that limits inclination of the cover with respect to the base portion.

19 Claims, 9 Drawing Sheets

(56) References Cited

FOREIGN PATENT DOCUMENTS

| JP | H05-079443 U | 10/1993 |
|----|----|----|
| JP | 2002-365122 A | 12/2002 |
| JP | 2003-014532 A | 1/2003 |
| JP | 2005-098949 A | 4/2005 |
| JP | 2014-111310 A | 6/2014 |
| JP | 5760485 B2 | 8/2015 |
| JP | 2016-205942 A | 12/2016 |
| JP | 2017-187362 A | 10/2017 |
| WO | 2018/235214 A1 | 12/2018 |
| WO | 2019/031502 A1 | 2/2019 |

OTHER PUBLICATIONS

International Search Report issued in corresponding International Patent Application No. PCT/JP2019/022639 dated Sep. 3, 2019.
Written Opinion issued in corresponding International Patent Application No. PCT/JP2019/022639 dated Sep. 3, 2019.
Office Action issued in corresponding Chinese Patent Application No. 201980096831.4 dated Dec. 13, 2023.

\* cited by examiner

TACTILE SENSOR, ROBOT HAND, AND ROBOT

TECHNICAL FIELD

The present disclosure relates to a tactile sensor, a robot hand, and a robot.

BACKGROUND ART

In Japanese Patent Application Laid-open No. 2016-205942 (patent document 1), for example, a multiaxial force sensor attached to the fingertip of a robot hand is described.

The multiaxial force sensor includes a sensor unit that has plural pressure sensors and a cover that covers the sensor unit. External forces input to the cover are transmitted to the pressure sensors of the sensor unit.

SUMMARY OF INVENTION

Technical Problem

However, in the conventional multiaxial force sensor, when an external force is input to, for example, an edge portion of the cover, the cover inclines.

Additionally, when the external force that is input increases, the inclination of the cover also increases. At this time, the cover becomes largely displaced, at the position to which the external force is input, in a direction toward a base portion. Meanwhile, the part of the cover away from the position where the external force is input becomes largely displaced in a direction away from the base portion.

Here, when a pressure sensor is disposed in the position where the cover is largely displaced in the direction toward the base portion, an unexpected overload is applied to the pressure sensor. Furthermore, when a pressure sensor is disposed in the position where the cover is largely displaced in the direction away from the base and a contact of the pressure sensor is adhered to the cover, the cover and the contact separate from each other. Because of these issues, there are concerns about the durability of the multiaxial force sensor being reduced.

It is an object of the present disclosure to provide a tactile sensor, a robot hand, and a robot that can inhibit failures regardless of the position where force is applied to a cover.

Solution to Problem

A tactile sensor of the present disclosure includes a cover that is provided so as to cover at least part of a base portion, a detection unit that is disposed between the cover and the base portion and detects force applied to the cover, and a limiting structure that limits inclination of the cover with respect to the base portion.

Advantageous Effects of Invention

According to the present disclosure, failures can be inhibited regardless of the position where force is applied to a cover.

DESCRIPTION OF EMBODIMENTS

First Embodiment

A first embodiment will be described below with reference to FIG. 1 to FIG. 3.

Figure 1:
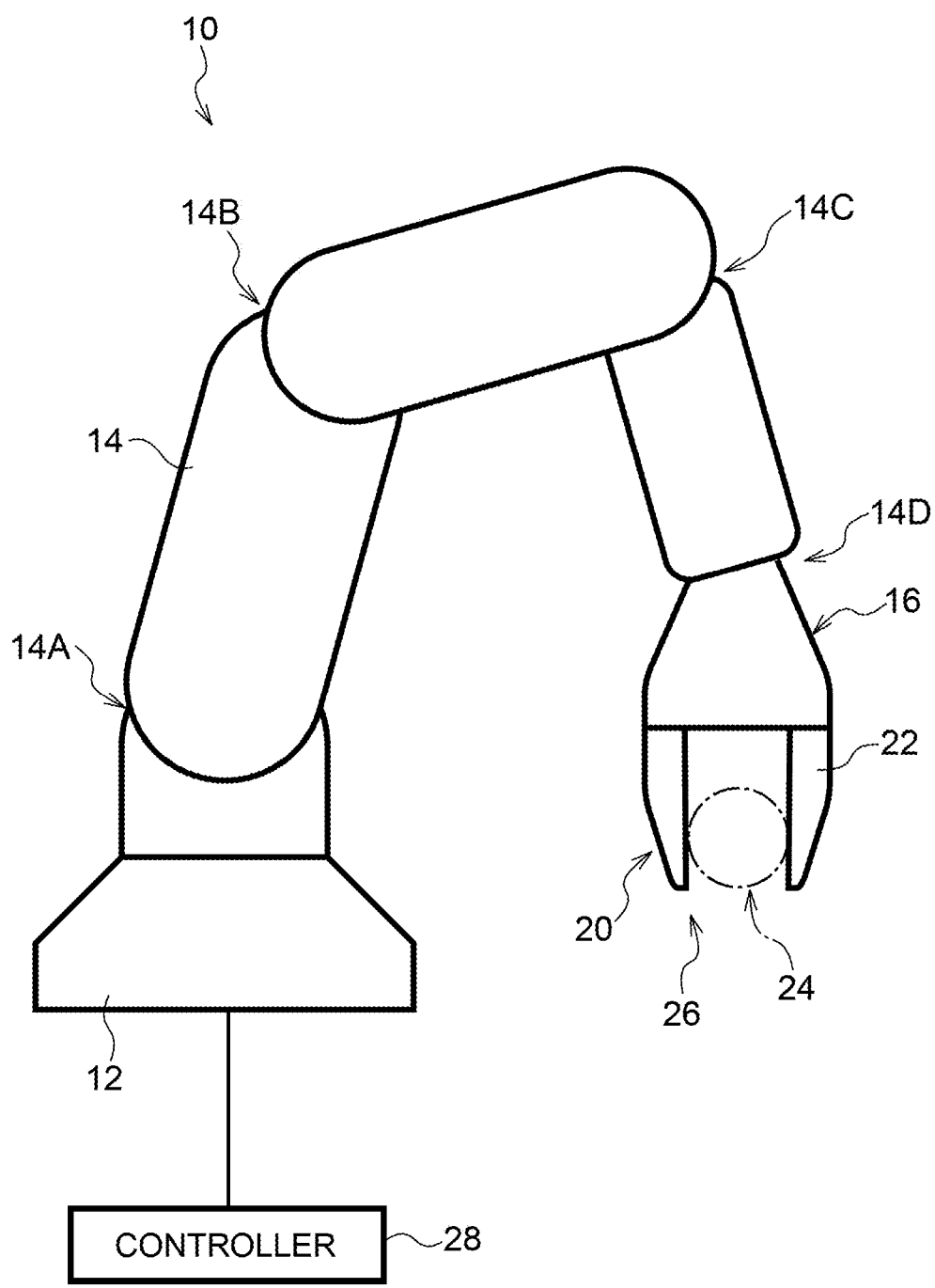
FIG. 1 is a schematic diagram showing a robot equipped with a robot hand pertaining to a first embodiment.

FIG. 1 is a diagram showing a robot 10 pertaining to this embodiment. The robot 10 includes a robot body 12, a robot arm 14 that extends from the robot body 12, and a robot hand 16 that is provided on a distal end of the robot arm 14.

The robot arm 14 is supported by the robot body 12 via a first joint 14A, and the robot arm 14 can rotate and bend with respect to the robot body 12. Furthermore, the robot arm 14 includes a second joint 14B and a third joint 14C and can bend in arbitrary directions at each of the joints 14B, 14C. The robot hand 16 is supported by the robot arm 14 via a fourth joint 14D, and the robot hand 16 can rotate and bend with respect to the robot arm 14.

The robot hand 16 includes a first finger 20 and a second finger 22, which are disposed opposing each other, and can hold an object 24 between the two fingers 20, 22. The first finger 20 is equipped with a tactile sensor 26, and the second finger 22 configures an opposing member that opposes the first finger 20 equipped with the tactile sensor 26.

A controller 28 is connected to the robot body 12. The robot body 12 outputs drive signals to actuators of the robot arm 14 and the robot hand 16 based on control signals from the controller 28 to drive the robot arm 14 and the robot hand 16.

Figure 2:
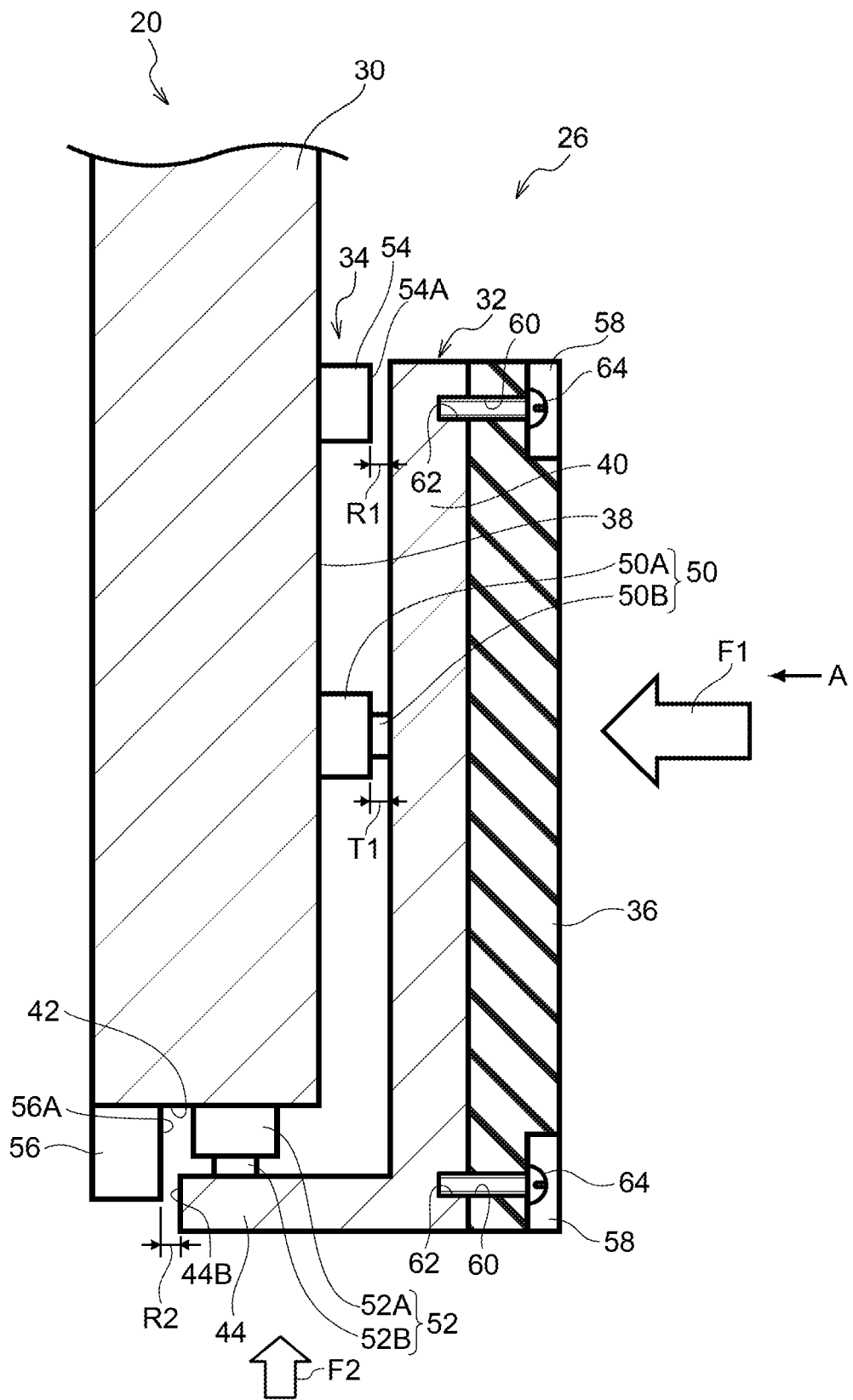
FIG. 2 is a sectional view showing main parts of the robot hand having a tactile sensor pertaining to the first embodiment.

FIG. 2 is a sectional view of main parts showing the first finger 20, and a base portion 30 configuring the first finger 20 applies gripping force according to relative displacement of the two fingers 20, 22 to the object 24 when it grips the object 24 together with the second finger 22 (see FIG. 1). The base portion 30 is equipped with the tactile sensor 26.

[Tactile Sensor]

The tactile sensor 26 includes a cover 32, which is provided so as to cover at least part of the base portion 30, and a detection unit (detailed below), which is disposed between the cover 32 and the base portion 30 and detects force F1 applied to the cover 32. Furthermore, the tactile sensor 26 includes a limiting structure 34 that limits inclination of the cover 32 with respect to the base portion 30. Additionally, a contact portion 36 that contacts a target place of the object 24 is replaceably attached to the cover 32.

[Cover]

The cover 32 has a side face covering portion 40 that is disposed along a base portion side face 38, which is a face of the base portion 30 positioned on the second finger 22 side, and an end face covering portion 44 that extends from the distal end of the side face covering portion 40 and is disposed along a base portion end face 42 on the distal end side of the base portion 30. The cover 32 is configured by a stainless steel plate as an example. The cover 32 may also be configured by, for example, an acrylic plate.

The side face covering portion 40 and the end face covering portion 44 are formed as rectangular plates, which is an arbitrary shape, and the cover 32 is L-shaped in cross section. The shape of the side face covering portion 40 and the end face covering portion 44 is not limited to a rectangular shape and may also be another shape.

(Detection Unit)

Figure 3:
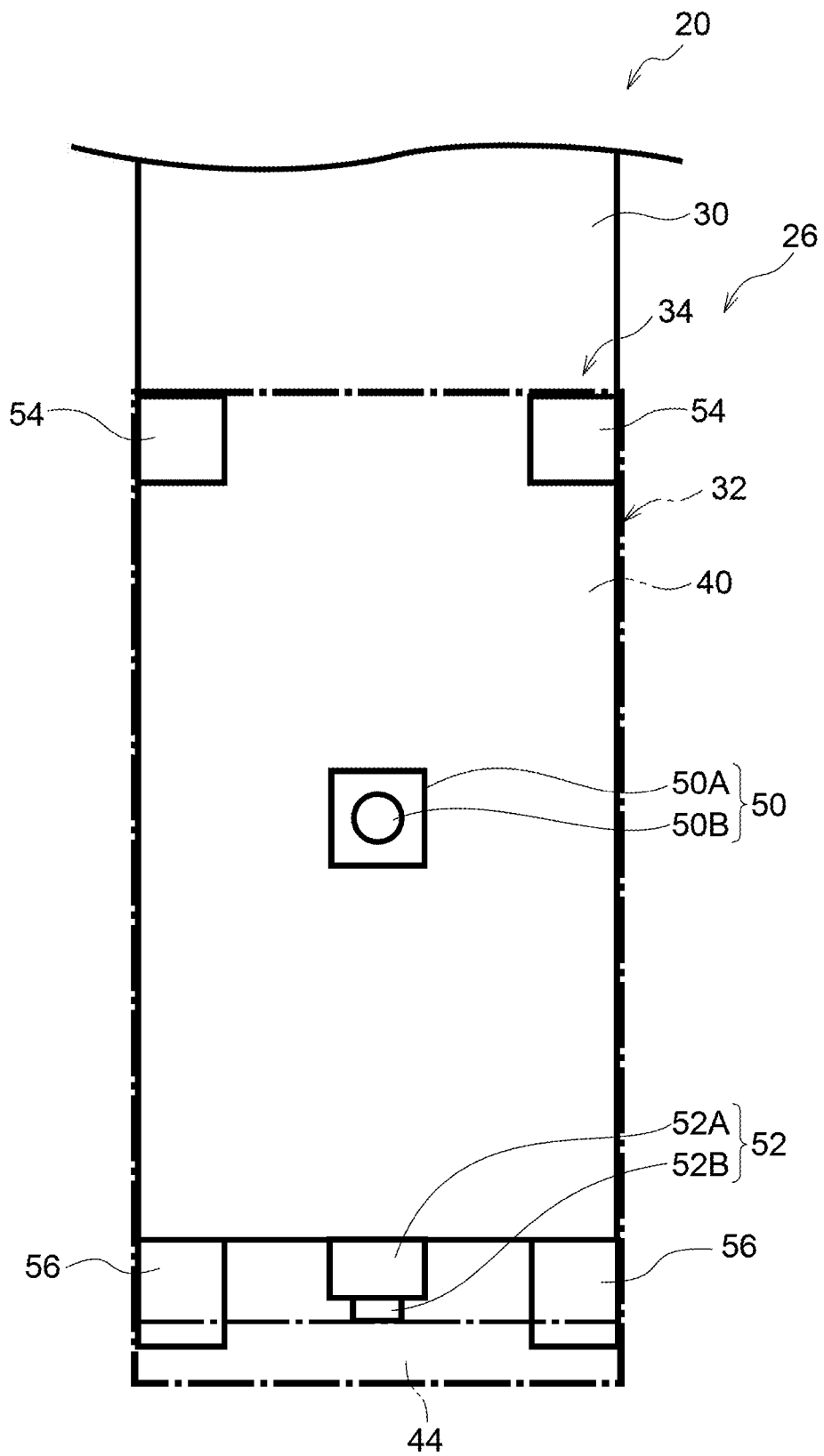
FIG. 3 is a partially transparent view showing main parts of the robot hand viewed from the direction of the arrow A in FIG. 2.

As shown in FIG. 2 and FIG. 3, the detection unit includes a side face detection unit 50 provided between the base portion side face 38 and the side face covering portion 40 and an end face detection unit 52 provided between the base portion end face 42 and the end face covering portion 44. The side face detection unit 50 is disposed in a place corresponding to the central portion of the side face covering portion 40 when viewed from the second finger 22 side, and the end face detection unit 52 is disposed in a place corresponding to the width direction central portion of the end face covering portion 44.

It will be noted that a plurality of the side face detection units 50 may be provided between the base portion side face 38 and the side face covering portion 40 and that a plurality of the end face detection units 52 may be provided between the base portion end face 42 and the end face covering portion 44.

The side face detection unit 50 and the end face detection unit 52 detect applied forces F1, F2 as electrical changes and transmit the detected electrical changes to the controller 28 via a harness not shown in the drawings. Examples of electrical changes include a change in capacitance, a change in resistance value, a change in current, a change in inductance, a charge transfer, and a change in resonance frequency.

The two detection units 50, 52 are configured by sensors, and the sensors can be called load sensors or force sensors.

The two detection units 50, 52 have identical configurations, and include rectangular sensor bodies 50A, 52A and cylindrical contacts 50B, 52B that project from the sensor bodies 50A, 52A. It will be noted that the two detection units 50, 52 may be different types of detection units and may be detection units with different measurement ranges.

The sensor body 50A of the side face detection unit 50 is fixed to the base portion side face 38, and the distal end of the contact 50B of the side face detection unit 50 is adhered to the side face covering portion 40 of the cover 32. The sensor body 52A of the end face detection unit 52 is fixed to the base portion end face 42, and the distal end of the contact 52B of the end face detection unit 52 is adhered to the end face covering portion 44 of the cover 32. Because of this, the cover 32 is supported by the base portion 30 via the detection units 50, 52, and the side face covering portion 40 and the end face covering portion 44 can be integrally displaced with respect to the base portion 30.

The contacts 50B, 52B of the detection units 50, 52 are configured to retract toward the sensor bodies 50A, 52A in accordance with the applied forces F1, F2 as an example, and the forces F1, F2 applied to the contacts 50B, 52B are measured from the amount of retraction of the contacts 50B, 52B. Because of this, the detection units 50, 52 detect the forces F1, F2 applied to the cover 32 from the relative displacement of the cover 32 with respect to the base portion 30.

(Limiting Structure)

The limiting structure 34 is configured by stoppers that limit movement of the cover 32 in a direction toward the base portion 30. The stoppers are disposed so as to surround the side face detection unit 50 and are disposed in the four corners of the side face covering portion 40. Because of this, the stoppers limit movement of the peripheral edge portion of the cover 32, and the stoppers share and receive, with the side face detection unit 50, the forces F1, F2 before an overload is applied to the tactile sensor 26.

The stoppers include side face stoppers 54 provided on the base portion side face 38 and end face stoppers 56 provided on the base portion end face 42. The side face stoppers 54 are fixed to the base portion 30, but they may also be fixed to the cover 32.

A distance dimension R1 from end faces 54A of the side face stoppers 54 to the side face covering portion 40 is smaller than a projection dimension T1 by which the contact 50B projects from the sensor body 50A when a rated load is applied to the side face detection unit 50. A distance dimension R2 from side faces 56A of the end face stoppers 56 to an end face 44B of the end face covering portion 44 is smaller than the projection dimension T1 by which the contact 50B projects from the sensor body 50A when the rated load is applied to the side face detection unit 50.

When the force F1 is applied to the cover 32 and the contact 50B of the side face detection unit 50 largely retracts, the cover 32 hits the stoppers 54, 56. When this happens, the stoppers 54, 56 share and receive, with the side face detection unit 50, the applied force F1. This regulates movement of the side face covering portion 40 toward the base portion side face 38 and thus limits retraction exceeding the allowable amount of the contact 50B of the side face detection unit 50 and inhibits input of an overload to the side face detection unit 50.

As shown in FIG. 3, the side face stoppers 54 are disposed in places opposing the two corner portions of the side face covering portion 40 on the robot arm 14 side, and the rectangular side face covering portion 40 can hit the side face stoppers 54 at two places on the base end side of the base portion 30. Furthermore, as shown in FIG. 2, the end face stoppers 56 are disposed in places opposing both length direction end portions of the end face 44B of the end face covering portion 44, and the rectangular side face covering portion 40 can hit the end face stoppers 56 via the end face covering portion 44 at two places on the distal end side of the base portion 30.

Because of this, movement of the rectangular side face covering portion 40 toward the base portion side face 38 is regulated by the stoppers 54, 56 at the four corners which are the peripheral edge portion, and inclination of the rectangular side face covering portion 40 exceeding the allowable amount with respect to the base portion 30 is limited.

(Contact Portion)

The contact portion 36 is configured by a rubber material formed in a tabular shape, and the contact portion 36 mitigates impact and shock between the first finger 20 and the object 24 when the first finger 20 and the second finger 22 grip the object 24.

Recessed portions 58 are formed in the four corners of the contact portion 36, and through holes 60 that penetrate to the reverse face are formed in bottom surfaces of the recessed portions 58. Screw holes 62 are formed in places in the side face covering portion 40 corresponding to the through holes 60, and screws 64 inserted into the through holes 60 in the contact portion 36 are screwed into the screw holes 62, whereby the contact portion 36 can be replaceably attached to the cover 32.

(Action and Effects)

Next, the action and effects of this embodiment will be described.

In the robot 10 of this embodiment, the first finger 20 of the robot hand 16 is provided with the tactile sensor 26. The tactile sensor 26 includes the cover 32 that covers part of the base portion 30 configuring the first finger 20, the detection units 50, 52 that are disposed between the cover 32 and the base portion 30 and detect the force F1 applied to the cover 32, and the limiting structure 34 that limits inclination of the cover 32 with respect to the base portion 30.

Because of this, even when the large force F1 (gripping force) is applied to part of the cover 32 when the first finger 20 and the second finger 22 grip the object 24, inclination of the cover 32 with respect to the base portion 30 is limited by the limiting structure 34.

For this reason, even when either of the detection units 50, 52 is disposed in the place where the cover becomes displaced in the direction closest to the base portion 30 when the cover inclines, application of an unexpected overload to that detection unit 50, 52 can be inhibited. Because of this, a failure of that detection unit 50, 52 can be inhibited.

Meanwhile, even when either of the detection units 50, 52 is disposed in the place where the cover becomes displaced in the direction farthest away from the base portion 30 when the cover inclines, separation of the contact 50B, 52B of that detection unit 50, 52 from the cover 32 can be inhibited.

Because of this, a reduction in the durability of the tactile sensor 26 can be inhibited and thus reduce the rate of occurrence of failures. Consequently, loss caused by a failure can be inhibited regardless of the positions where the forces F1, F2 are applied to the cover 32.

Furthermore, the detection units 50, 52 detect the forces F1, F2 applied to the cover 32 from the relative displacement of the cover 32 with respect to the base portion 30. For this reason, a reduction in detection accuracy caused by a failure of the detection units 50, 52 can be inhibited.

Additionally, the cover 32 has the side face covering portion 40 that is disposed along the base portion side face 38 of the base portion 30 and the end face covering portion 44 that extends from the distal end portion of the side face covering portion 40 and is disposed along the base portion end face 42 of the base portion 30. Furthermore, the detection units 50, 52 are disposed between the base portion side face 38 and the side face covering portion 40 and between the base portion end face 42 and the end face covering portion 44.

Because of this, in addition to the force F1 (gripping force) applied from the side face of the base portion 30, the force F2 (pressing force) from the distal end side of the base portion 30 can also be detected.

Furthermore, the limiting structure 34 is configured by the stoppers 54, 56 that limit movement of the cover 32 in a direction toward the base portion 30. For this reason, it becomes possible to adjust the arrangement of the stoppers 54, 56 in accordance with the inclination allowed of the cover 32.

Moreover, the stoppers 54, 56 limit movement of the peripheral edge portion of the cover 32 formed in an arbitrary shape. For this reason, the stoppers 54, 56 can stably inhibit inclination of the cover 32 compared to a case where they limit movement of the central portion of the cover 32 formed in an arbitrary shape.

Additionally, the contact portion 36 that contacts the target place is replaceably attached to the cover 32. For this reason, contact portions 36 suited to objects 24 to be gripped and the work to be performed by the robot hand 16 can be selected and attached.

Specifically, when gripping a slippery object 24, for example, a contact portion 36 having a high coefficient of friction can be attached, so that workability resulting from the robot 10 can be improved.

Furthermore, when the contact portion 36 deteriorates, just the contact portion 36 can be replaced. Because of this, the maintainability of the robot hand 16 is improved.

Second Embodiment

Figure 4:
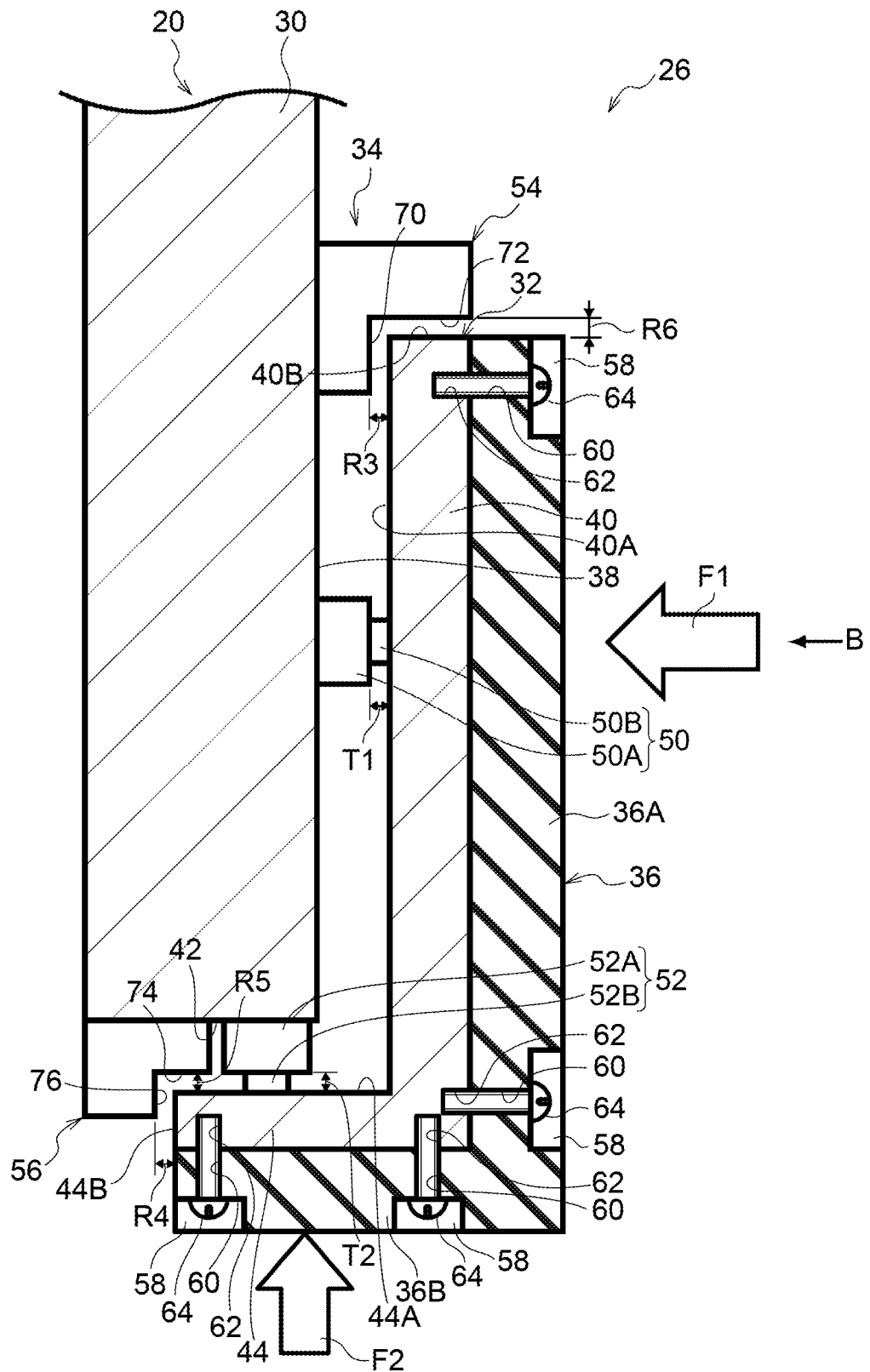
FIG. 4 is a sectional view showing main parts of the robot hand having a tactile sensor pertaining to a second embodiment.
Figure 5:
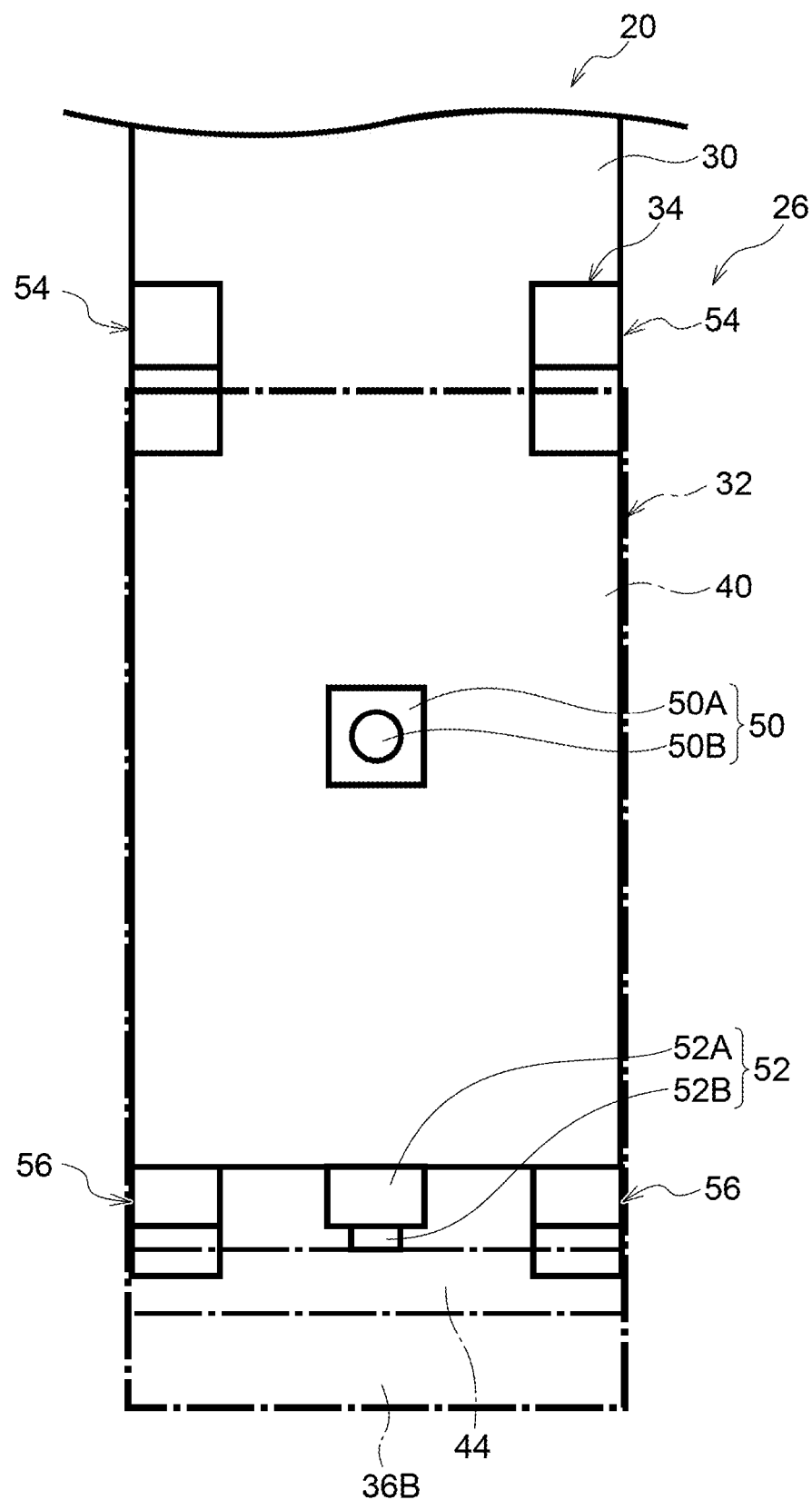
FIG. 5 is a partially transparent view showing main parts of the robot hand viewed from the direction of arrow B in FIG. 4.

FIG. 4 and FIG. 5 are drawings showing a second embodiment; parts identical or similar to those of the first embodiment are denoted by the same reference signs and description thereof is omitted, and only parts that are different will be described.

The tactile sensor 26 provided on the first finger 20 of the robot pertaining to this embodiment differs from that of the first embodiment in that it has a different limiting structure 34 for limiting inclination of the cover 32 with respect to the base portion 30. Specifically, the shape of the stoppers configuring the limiting structure 34 and the shape of the contact portion 36 are different compared to those of the first embodiment.

(Limiting Structure)

That is, the limiting structure 34 is configured by side face stoppers 54 and end face stoppers 56 that limit movement of the cover 32 in a direction toward the base portion 30.

(Side Face Stoppers)

The side face stoppers 54 have sideward face contacting portions 70 that contact a reverse face 40A of the side face covering portion 40 and limit movement of the side face covering portion 40 in a direction toward the base portion side face 38. Furthermore, the side face stoppers 54 have sideward end contacting portions 72 that contact an end face 40B of the side face covering portion 40 and limit movement of the end face covering portion 44 in a direction toward the base portion end face 42.

The side face stoppers 54 are formed so as to be L-shaped in cross section, and the sideward face contacting portions 70 are configured by flat surfaces that oppose the reverse face 40A of the side face covering portion 40. Furthermore, the sideward end contacting portions 72 are configured by flat surfaces that oppose the end face 40B of the side face covering portion 40.

(End Face Stoppers)

The end face stoppers 56 have endwardface contacting portions 74 that contact a reverse face 44A of the end face covering portion 44 and limit movement of the end face covering portion 44 in a direction toward the base portion end face 42. Furthermore, the end face stoppers 56 have endward end contacting portions 76 that contact an end face 44B of the end face covering portion 44 and limit movement of the side face covering portion 40 in a direction toward the base portion side face 38.

The end face stoppers 56 are formed so as to be L-shaped in cross section, and the endward face contacting portions 74 are configured by flat surfaces that oppose the reverse face 44A of the end face covering portion 44. Furthermore, the endward end contacting portions 76 are configured by flat surfaces that oppose the end face 44B of the end face covering portion 40.

A distance dimension R3 from the sideward face contacting portions 70 of the side face stoppers 54 to the side face covering portion 40 is smaller than the projection dimension T1 by which the contact 50B projects from the sensor body 50A when the rated load is applied to the side face detection unit 50. A distance dimension R4 from the endward end contacting portions 76 of the end face stoppers 56 to the end face 44B of the end face covering portion 44 is smaller than the projection dimension T1 by which the contact 50B projects from the sensor body 50A when the rated load is applied to the side face detection unit 50.

A distance dimension R5 from the endward face contacting portions 74 of the end face stoppers 56 to the end face covering portion 44 is smaller than a projection dimension T2 by which the contact 52B projects from the sensor body 52A when the rated load is applied to the end face detection unit 52. A distance dimension R6 from the sideward end contacting portions 72 of the side face stoppers 54 to the end face 40B of the side face covering portion 40 is smaller than the projection dimension T2 by which the contact 52B projects from the sensor body 52A when the rated load is applied to the end face detection unit 52.

When the force F1 is applied from the side face side of the cover 32 and the contact 50B of the side face detection unit 50 largely retracts, the cover 32 hits the sideward face contacting portions 70 of the side face stoppers 54 and the endward end contacting portions 76 of the end face stoppers 56. When this happens, the stoppers 54, 56 receive the applied force F1. This regulates movement of the side face covering portion 40 toward the base portion side face 38 and thus limits retraction exceeding the allowable amount of the contact 50B of the side face detection unit 50 and inhibits input of an overload to the side face detection unit 50.

Furthermore, when the force F2 is applied from the distal end side of the cover 32 and the contact 52B of the end face detection unit 52 largely retracts, the cover 32 hits the sideward end contacting portions 72 of the side face stoppers 54 and the endward face contacting portions 74 of the end face stoppers 56. When this happens, the stoppers 54, 56 receive the applied force F2. This regulates movement of the end face covering portion 44 toward the base portion end face 42 and thus limits retraction exceeding the allowable amount of the contact 52B of the end face detection unit 52 and inhibits input of an overload to the end face detection unit 52.

Additionally, movement of the rectangular side face covering portion 40 toward the base portion side face 38 is regulated by the stoppers 54, 56 at the four corners, and inclination of the rectangular side face covering portion 40 exceeding the allowable amount with respect to the base portion side face 38 is limited. Furthermore, movement of the rectangular end face covering portion 44 toward the base portion end face 42 is regulated by the stoppers 54, 56 at the four corners, and inclination of the rectangular end face covering portion 44 exceeding the allowable amount with respect to the base portion end face 42 is limited.

(Contact Portion)

The contact portion 36 has a side face portion 36A disposed along the side face covering portion 40 of the cover 32 and an end face portion 36B disposed along the end face covering portion 44, and the contact portion 36 is formed so as to be L-shaped in cross section.

Recessed portions 58 are formed in the four corners of the side face portion 34A and the end face portion 36B of the contact portion 36, and screws 64 inserted into through holes 60 in the bottom surfaces of the recessed portions 58 are screwed into screw holes 62 in the cover 32, whereby the contact portion 36 can be replaceably attached to the cover 32.

(Action and Effects)

In this embodiment also, the same action and effects can be obtained in regard to parts identical or similar to those of the first embodiment.

Furthermore, in this embodiment, the force F2 applied to the cover 32 from the distal end side of the base portion 30 can be received at the four corners of the end face covering portion 44 by the stoppers 54, 56. Because of this, inclination of the end face covering portion 44 of the cover 32 with respect to the base portion end face 42 can be limited.

For this reason, application of an unexpected overload to the end face detection unit 52 can be inhibited, and a failure of the end face detection unit 52 can be inhibited. Furthermore, separation of the contact 52B of the end face detection unit 52 from the cover 32 can be inhibited.

Because of this, a reduction in the durability of the tactile sensor 26 can be inhibited and thus reduce the rate of occurrence of failures, and loss caused by a failure can be inhibited regardless of the positions where the forces F1, F2 are applied to the cover 32.

Moreover, in this embodiment, the end face stoppers 56 having the endward face contacting portions 74 and the endward end contacting portions 76 and the side face stoppers 54 having the sideward end contacting portions 72 and the sideward face contacting portions 70 are used. Because of this, inclination of the end face covering portion 44 of the cover 32 with respect to the base portion end face 42 and inclination of the side face covering portion 40 of the cover 32 with respect to the base portion side face 38 can be limited.

Third Embodiment

Figure 6:
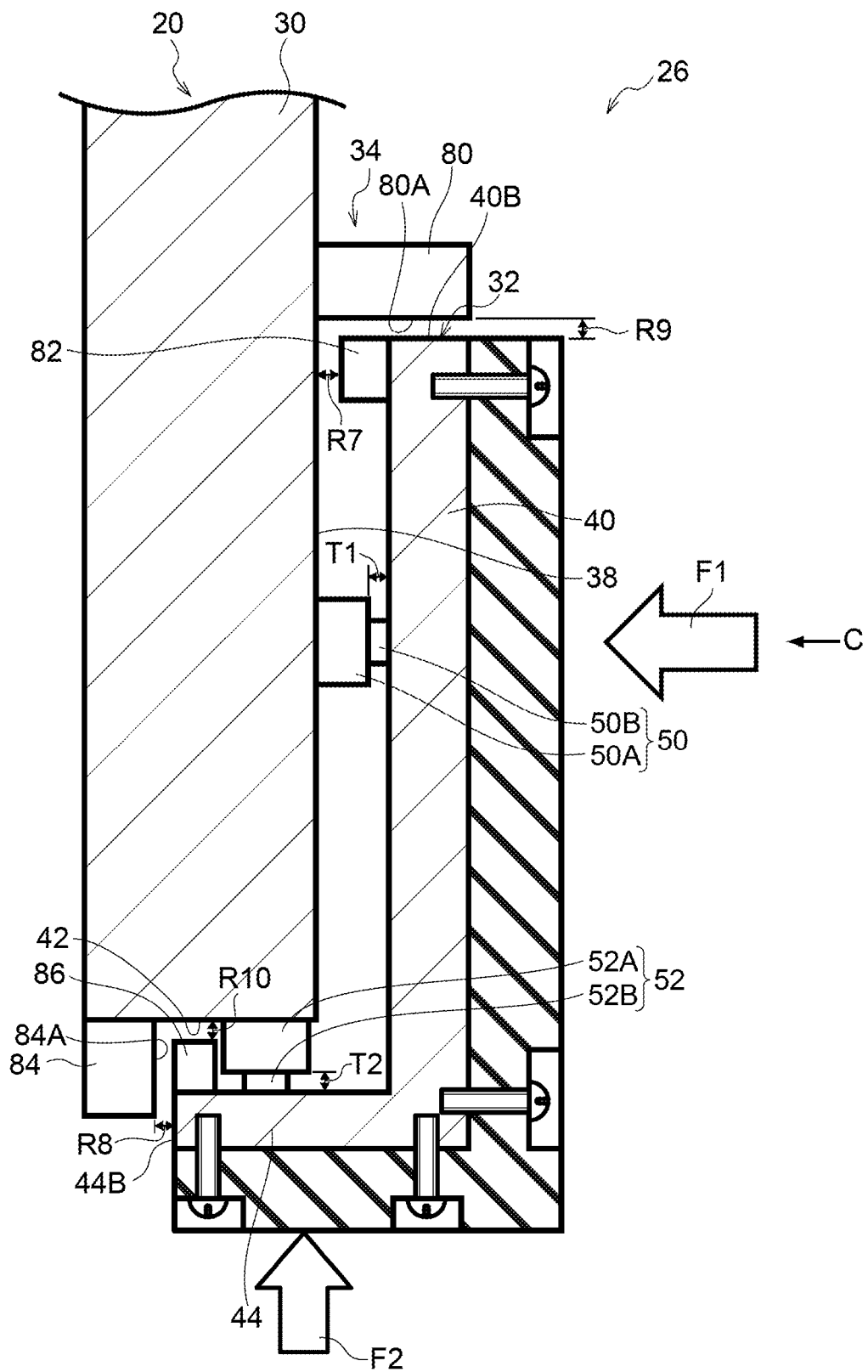
FIG. 6 is a sectional view showing main parts of the robot hand having a tactile sensor pertaining to a third embodiment.
Figure 7:
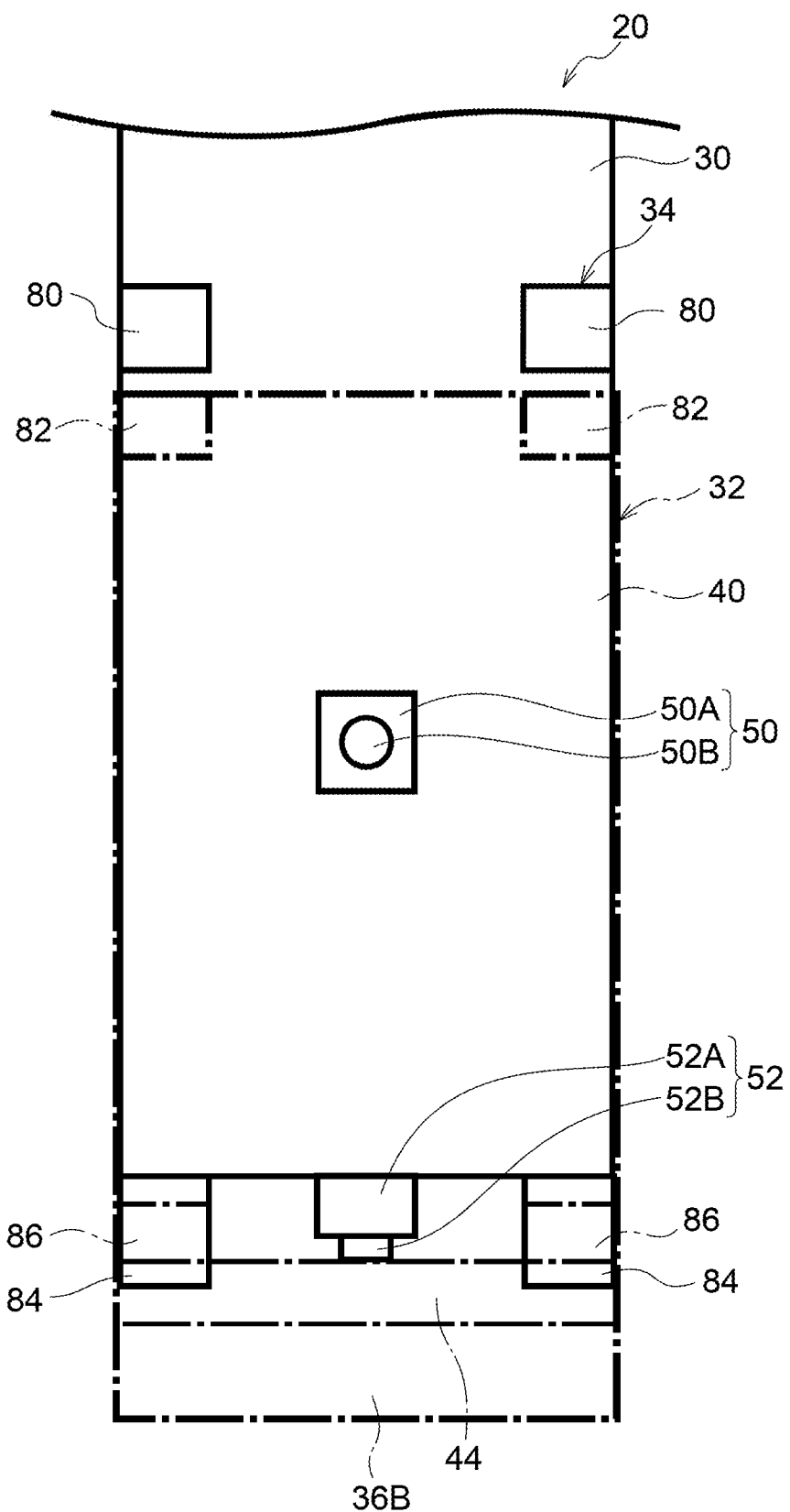
FIG. 7 is a partially transparent view showing main parts of the robot hand viewed from the direction of arrow C in FIG. 6.

FIG. 6 and FIG. 7 are drawings showing a third embodiment; parts identical or similar to those of the first embodiment and the second embodiment are denoted by the same reference signs and description thereof is omitted, and only parts that are different will be described.

The tactile sensor 26 provided on the first finger 20 of the robot 10 pertaining to this embodiment differs from those of the first embodiment and the second embodiment in that it has a different limiting structure 34 for limiting inclination of the cover 32 with respect to the base portion 30. Specifically, the stoppers configuring the limiting structure 34 are different compared to those of the first embodiment and the second embodiment.

(Limiting Structure)

That is, the stoppers configuring the limiting structure 34 include first side face stoppers 80 provided on the base portion side face 38 and second side face stoppers 82 provided on the side face covering portion 40. Furthermore, the stoppers configuring the limiting structure 34 include first end face stoppers 84 provided on the base portion end face 42 and second end face stoppers 86 provided on the end face covering portion 44.

The second side face stoppers 82 and the first end face stoppers 84 limit movement of the side face covering portion 40 in a direction toward the base portion side face 38. The first side face stoppers 80 and the second end face stoppers 86 limit movement of the end face covering portion 44 in a direction toward the base portion end face 42.

A distance dimension R7 from the second side face stoppers 82 to the base portion side face 38 and a distance dimension R8 from side faces 84A of the first end face stoppers 84 to the end face 44B of the end face covering portion 44 are smaller than the projection dimension T1 by which the contact 50B projects when the rated load is applied to the side face detection unit 50. A distance dimension R9 from side faces 80A of the first side face stoppers 80 to the end face 40B of the side face covering portion 40 and a distance dimension R10 from the second end face stoppers 86 to the base portion end face 42 are smaller than the projection dimension T2 by which the contact 52B projects when the rated load is applied to the end face detection unit 52.

When the force F1 is applied from the side face side of the cover 32 and the contact 50B of the side face detection unit 50 largely retracts, the second side face stoppers 82 hit the base portion side face 38. Furthermore, the end face 44B of the end face covering portion 44 hits the side faces 84A of the first end face stoppers 84. When this happens, the stoppers 82, 84 receive the applied force F1. This regulates movement of the side face covering portion 40 toward the base portion side face 38 and thus limits retraction exceeding the allowable amount of the contact 50B of the side face detection unit 50 and inhibits input of an overload to the side face detection unit 50.

Furthermore, when the force F2 is applied from the distal end side of the cover 32 and the contact 52B of the end face detection unit 52 largely retracts, the end face 40B of the side face covering portion 40 hits the side faces 80A of the first side face stoppers 80. Furthermore, the second end face stoppers 86 hit the base portion end face 42. When this happens, the stoppers 80, 86 receive the applied force F2. This regulates movement of the end face covering portion 44 toward the base portion end face 42 and thus limits retraction exceeding the allowable amount of the contact 52B of the end face detection unit 52 and inhibits input of an overload to the end face detection unit 52.

Additionally, movement of the rectangular side face covering portion 40 toward the base portion side face 38 is regulated at the four corners by the stoppers 82, 84, and inclination of the rectangular side face covering portion 40 exceeding the allowable amount with respect to the base portion side face 38 is limited. Furthermore, movement of the rectangular end face covering portion 44 toward the base portion end face 42 is regulated at the four corners by the stoppers 80, 86, and inclination of the rectangular end face covering portion 44 exceeding the allowable amount with respect to the base portion end face 42 is limited.

(Action and Effects)

In this embodiment also, the same action and effects can be obtained in regard to parts identical or similar to those of the first embodiment and the second embodiment.

Fourth Embodiment

Figure 8:
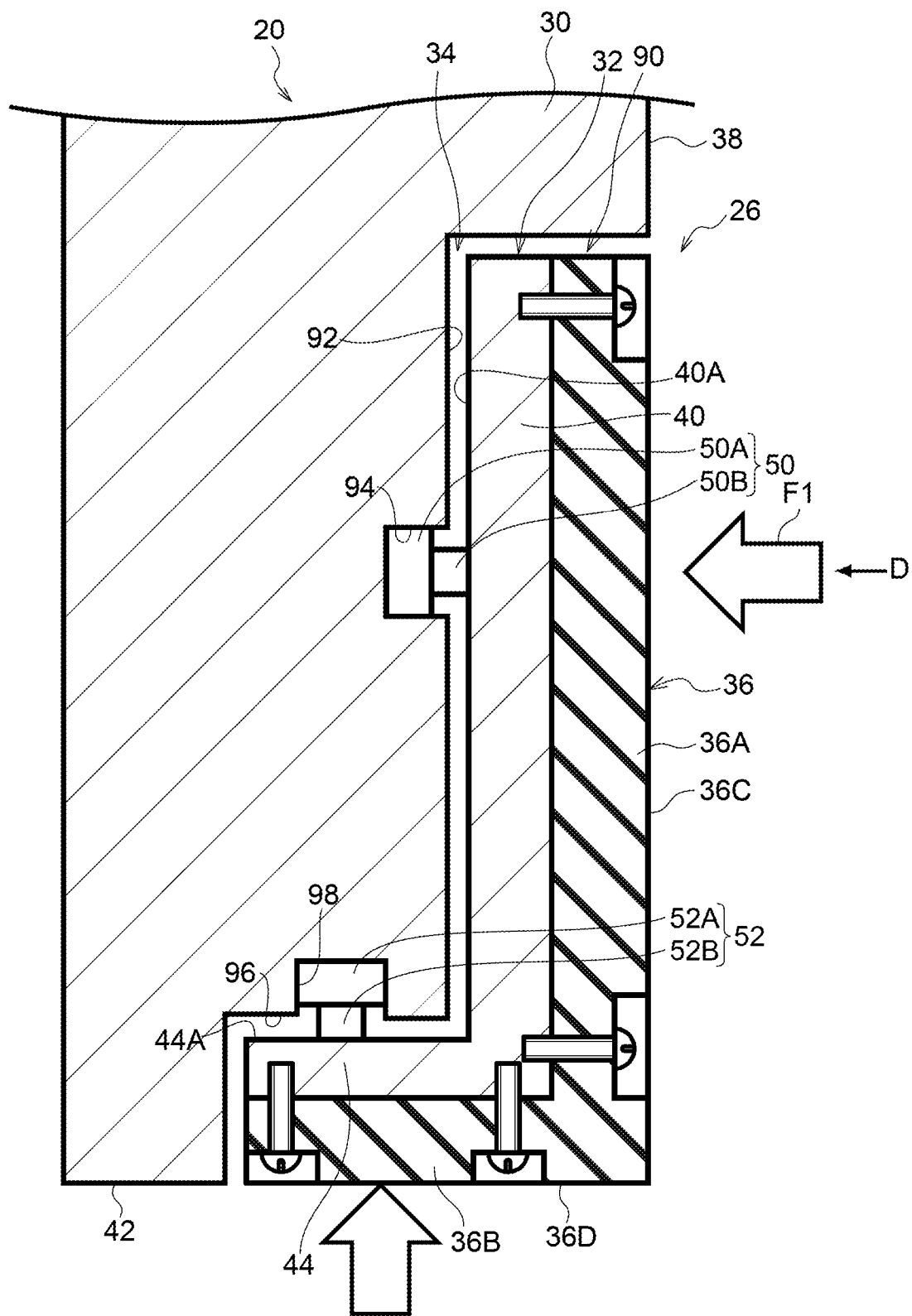
FIG. 8 is a sectional view showing main parts of the robot hand having a tactile sensor pertaining to a fourth embodiment.
Figure 9:
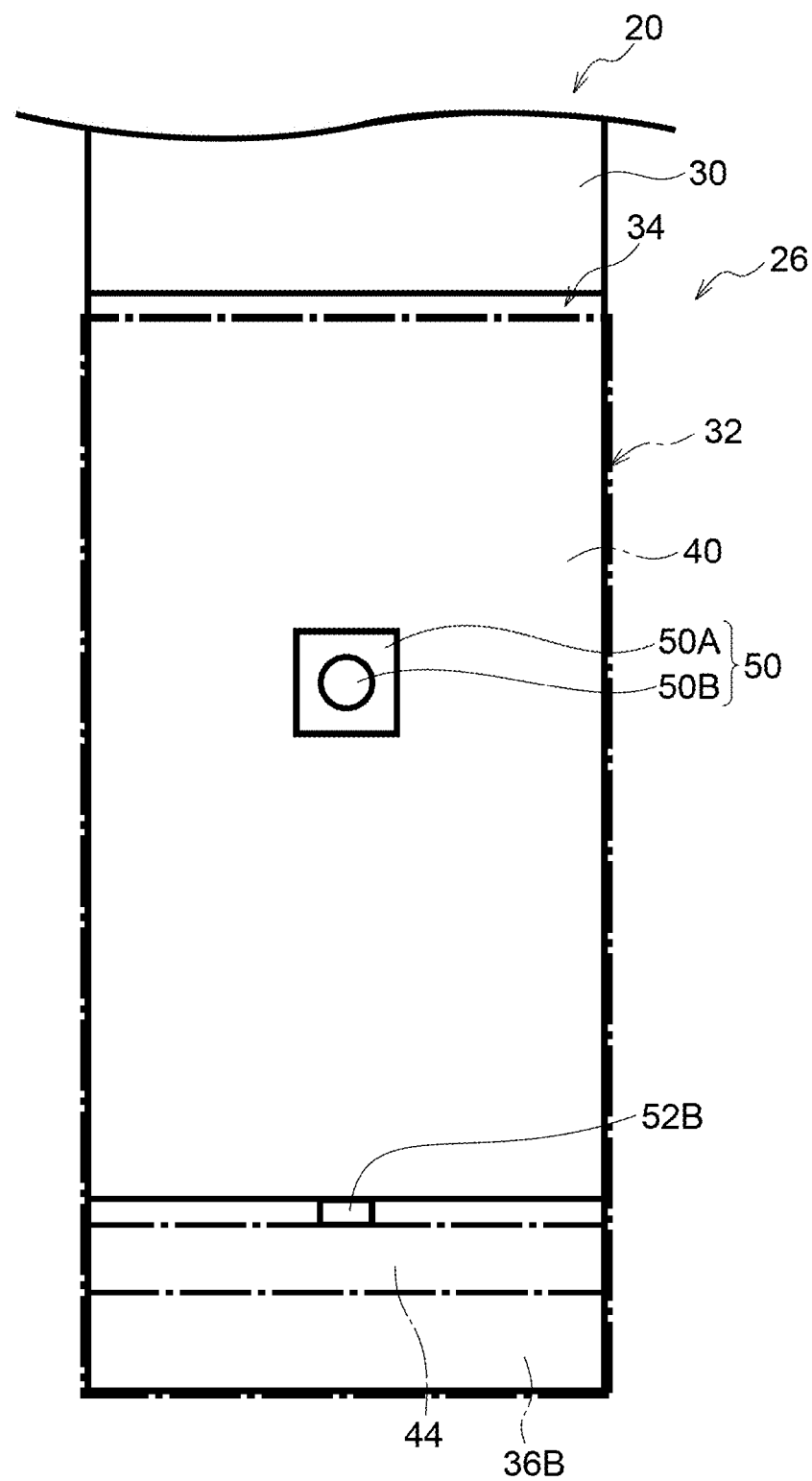
FIG. 9 is a partially transparent view showing main parts of the robot hand viewed from the direction of arrow D in FIG. 8.

FIG. 8 and FIG. 9 are drawings showing a fourth embodiment; parts identical or similar to those of the first embodiment to the third embodiment are denoted by the same reference signs and description thereof is omitted, and only parts that are different will be described.

The tactile sensor 26 provided on the first finger 20 of the robot 10 pertaining to this embodiment differs from those of the first embodiment to the third embodiment in that it has a different limiting structure 34 for limiting inclination of the cover 32 with respect to the base portion 30.

(Base Portion)

In the base portion 30 configuring the first finger 20 of the robot hand 16, a cover housing portion 90 that is inwardly set back is formed in the distal end portion of the base portion side face 38 on the second finger 22 side and in the base portion end face 42 on the second finger 22 side. The cover 32 is disposed in the cover housing portion 90, and part of the base portion 30 is covered by the cover 32.

The contact portion 36 is attached to the cover 32. An obverse face 36C of a side face portion 36A of the contact portion 36 and the base portion side face 38 are configured to be positioned in the same plane. An obverse face 36D of an end face portion 36B of the contact portion 36 and the base portion end face 42 are configured to be positioned in the same plane.

A side face mounting hole 94 is formed in the central portion of a side portion bottom surface 92 of the cover housing portion 90 that is set back from the base portion side face 38, and the side face detection unit 50 is disposed in the side face mounting hole 94. The side face mounting hole 94 is set to a depth where the contact 50B of the side face detection unit 50 disposed therein projects from the side portion bottom surface 92, and the contact 50B of the side face detection unit 50 is adhered to the side face covering portion 40 of the cover 32.

An end face mounting hole 98 is formed in the central portion of an end portion bottom surface 96 of the cover housing portion 90 that is set back from the base portion end face 42, and the end face detection unit 52 is disposed in the end face mounting hole 98. The end face mounting hole 98 is set to a depth where the contact 52B of the end face detection unit 52 disposed therein projects from the end portion bottom surface 96, and the contact 52B of the end face detection unit 52 is adhered to the end face covering portion 44 of the cover 32.

(Limiting Structure)

When the force F1 is applied from the side face side of the cover 32 and the contact 50B of the side face detection unit 50 largely retracts, the reverse face 40A of the side face covering portion 40 hits the side portion bottom surface 92. When this happens, the side portion bottom surface 92 receives the applied force F1. This regulates movement of the side face covering portion 40 and thus limits retraction exceeding the allowable amount of the contact 50B of the side face detection unit 50 and inhibits input of an overload to the side face detection unit 50.

Furthermore, when the force F2 is applied from the distal end side of the cover 32 and the contact 52B of the end face detection unit 52 largely retracts, the reverse face 44A of the end face covering portion 44 hits the end portion bottom surface 96. When this happens, the end portion bottom surface 96 receives the applied force F2. This regulates movement of the end face covering portion 44 and thus limits retraction exceeding the allowable amount of the contact 52B of the end face detection unit 52 and inhibits input of an overload to the end face detection unit 52.

Additionally, movement of the side face covering portion 40 toward the base portion 30 is regulated by the side portion bottom surface 92 on the outer peripheral portion of the side face mounting hole 94, so inclination of the side face covering portion 40 exceeding the allowable amount with respect to the side portion bottom surface 92 is limited. Furthermore, movement of the end face covering portion 44 toward the base portion 30 is regulated by the end portion bottom surface 96 on the outer peripheral portion of the end face mounting hole 98, so inclination of the end face covering portion 44 exceeding the allowable amount with respect to the end portion bottom surface 96 is limited.

The limiting structure 34 is configured in the tactile sensor 26 by the side portion bottom surface 92, the end portion bottom surface 96, the depth of the side face mounting hole 94, and the depth of the end face mounting hole 98.

(Action and Effects)

In this embodiment also, the same action and effects can be obtained in regard to parts identical or similar to those of the first embodiment to the third embodiment.

Furthermore, the configuration of the limiting structure 34 can be simplified compared to a case where the limiting structure 34 is configured by providing stoppers on the base portion 30 or the cover 32.

It will be noted that although in the embodiments a case was described where the tactile sensor 26 is provided on the first finger 20 of the robot hand 16, the tactile sensor 26 is not limited to this. For example, the tactile sensor 26 may also be provided on a wrist portion of the robot 10. Furthermore, the tactile sensor 26 may also be provided on both the first finger 20 and the second finger 22. Moreover, the end face detection unit 52 may also be omitted. Furthermore, the detection units 50, 52 may also be provided on the cover 32.

Below is a description of the reference signs.
10 Robot
12 Robot Body
16 Robot Hand
20 First Finger
22 Second Finger
24 Object
26 Tactile Sensor
30 Base Portion
32 Cover
34 Limiting Structure
36 Contact Portion
38 Base Portion Side Face
40 Side Face Covering Portion
42 Base Portion End Face
44 End Face Covering Portion
50 Side Face Detection Unit
52 End Face Detection Unit
54 Side Face Stopper
56 End Face Stopper
70 Sideward Face Contacting Portion
72 Sideward End Contacting Portion
74 Endward Face Contacting Portion
76 Endward End Contacting Portion
80 First Side Face Stopper
82 Second Side Face Stopper
84 First End Face Stopper
86 Second End Face Stopper <<Additional Remarks>>

From this specification the following aspects are conceptualized.

Aspect 1 is a tactile sensor including:
a cover that is provided so as to cover at least part of a base portion;
a detection unit that is disposed between the cover and the base portion and detects force applied to the cover; and
a limiting structure that limits inclination of the cover with respect to the base portion.

Aspect 2 is the tactile sensor of aspect 1, wherein the detection unit detects force applied to the cover from relative displacement of the cover with respect to the base portion.

Aspect 3 is the tactile sensor of aspect 1 or aspect 2, wherein;
the cover has a side face covering portion that is disposed along a base portion side face of the base portion and an end face covering portion that extends from the side face covering portion and is disposed along a base portion end face of the base portion, and
the detection unit is disposed between the base portion side face and the side face covering portion and between the base portion end face and the end face covering portion.

Aspect 4 is the tactile sensor of aspect 3, wherein the limiting structure comprises a stopper that limits movement of the cover in a direction toward the base portion.

Aspect 5 is the tactile sensor of aspect 4, wherein the stopper limits movement of a peripheral edge portion of the cover formed in an arbitrary shape.

Aspect 6 is the tactile sensor of aspect 4 or aspect 5, wherein
the stopper includes a side face stopper provided at the base portion side face and an end face stopper provided at the base portion end face,
the side face stopper has a sideward face contacting portion that contacts the side face covering portion and limits movement of the side face covering portion in a direction toward the base portion side face and a sideward end contacting portion that contacts an end face of the side face covering portion and limits movement of the end face covering portion in a direction toward the base portion end face, and
the end face stopper has an endward face contacting portion that contacts the end face covering portion and limits movement of the end face covering portion in a direction toward the base portion end face and an endward end contacting portion that contacts an end face of the end face covering portion and limits movement of the side face covering portion in a direction toward the base portion side face.

Aspect 7 is the tactile sensor of aspect 4 or aspect 5, wherein
the stopper includes a first side face stopper provided at the base portion side face, a second side face stopper provided at the side face covering portion, a first end face stopper provided at the base portion end face, and a second end face stopper provided at the end face covering portion, and
the second side face stopper and the first end face stopper limit movement of the side face covering portion in a direction toward the base portion side face, and the first side face stopper and the second end face stopper limit movement of the end face covering portion in a direction toward the base portion end face.

Aspect 8 is the tactile sensor of any of aspect 1 to aspect 7, wherein a contact portion that contacts a target place is replaceably attached to the cover.

Aspect 9 is a robot hand including:
the tactile sensor of any of aspect 1 to aspect 8; and
an opposing member that is disposed opposing the tactile sensor and grips an object between itself and the tactile sensor.

Aspect 10 is a robot including:
the robot hand of aspect 9; and
a robot body that drives the robot hand.

All publications, patent applications, and technical standards mentioned in this specification are incorporated by reference herein to the same extent as if each individual publication, patent application, or technical standard were specifically and individually indicated to be incorporated by reference.

The invention claimed is:

1. A tactile sensor comprising:
a cover that is provided so as to cover at least part of a base portion;
a detection unit comprising a sensor body and a contact, wherein the detection unit is disposed between the cover and the base portion and detects force applied to the cover; and
a limiting structure that limits inclination of the cover with respect to the base portion,
wherein the detection unit detects a force applied to the cover from relative displacement of the cover with respect to the base portion, and
wherein relative displacement of the cover with respect to the base portion is caused by retraction of the contact toward the sensor body.

2. The tactile sensor of claim 1, wherein:
the cover has a side face covering portion that is disposed along a base portion side face of the base portion and an end face covering portion that extends from the side face covering portion and is disposed along a base portion end face of the base portion, and
the detection unit is disposed between the base portion side face and the side face covering portion and between the base portion end face and the end face covering portion.

3. The tactile sensor of claim 2, wherein the limiting structure comprises a stopper that limits movement of the cover in a direction toward the base portion.

4. The tactile sensor of claim 3, wherein the stopper limits movement of a peripheral edge portion of the cover formed in an arbitrary shape.

5. The tactile sensor of claim 3, wherein:
the stopper includes a side face stopper provided at the base portion side face and an end face stopper provided at the base portion end face,
the side face stopper has a sideward face contacting portion that contacts the side face covering portion and limits movement of the side face covering portion in a direction toward the base portion side face and a sideward end contacting portion that contacts an end face of the side face covering portion and limits movement of the end face covering portion in a direction toward the base portion end face, and
the end face stopper has an endward face contacting portion that contacts the end face covering portion and limits movement of the end face covering portion in a direction toward the base portion end face and an endward end contacting portion that contacts an end face of the end face covering portion and limits movement of the side face covering portion in a direction toward the base portion side face.

6. The tactile sensor of claim 3, wherein:
the stopper includes a first side face stopper provided at the base portion side face, a second side face stopper provided at the side face covering portion, a first end face stopper provided at the base portion end face, and a second end face stopper provided at the end face covering portion, and
the second side face stopper and the first end face stopper limit movement of the side face covering portion in a direction toward the base portion side face, and the first side face stopper and the second end face stopper limit movement of the end face covering portion in a direction toward the base portion end face.

7. The tactile sensor of claim 1, wherein a contact portion that contacts a target place is replaceably attached to the cover.

8. A robot hand comprising:
the tactile sensor of claim 1; and
an opposing member that is disposed opposing the tactile sensor and grips an object between itself and the tactile sensor.

9. A robot comprising:
the robot hand of claim 8; and
a robot body that drives the robot hand.

10. The tactile sensor of claim 1, wherein:
the cover has a side face covering portion that is disposed along a base portion side face of the base portion and an end face covering portion that extends from the side face covering portion and is disposed along a base portion end face of the base portion, and
the detection unit is disposed between the base portion side face and the side face covering portion and between the base portion end face and the end face covering portion.

11. The tactile sensor of claim 4, wherein:
the stopper includes a side face stopper provided at the base portion side face and an end face stopper provided at the base portion end face,
the side face stopper has a sideward face contacting portion that contacts the side face covering portion and limits movement of the side face covering portion in a direction toward the base portion side face and a sideward end contacting portion that contacts an end face of the side face covering portion and limits movement of the end face covering portion in a direction toward the base portion end face, and
the end face stopper has an endward face contacting portion that contacts the end face covering portion and limits movement of the end face covering portion in a direction toward the base portion end face and an endward end contacting portion that contacts an end face of the end face covering portion and limits movement of the side face covering portion in a direction toward the base portion side face.

12. The tactile sensor of claim 4, wherein:
the stopper includes a first side face stopper provided at the base portion side face, a second side face stopper provided at the side face covering portion, a first end face stopper provided at the base portion end face, and a second end face stopper provided at the end face covering portion, and
the second side face stopper and the first end face stopper limit movement of the side face covering portion in a direction toward the base portion side face, and the first side face stopper and the second end face stopper limit movement of the end face covering portion in a direction toward the base portion end face.

13. The tactile sensor of claim 1, wherein a contact portion that contacts a target place is replaceably attached to the cover.

14. The tactile sensor of claim 1, wherein:
the detection unit comprises a plurality of detection units disposed between the cover and the base portion.

15. The tactile sensor of claim 2, wherein:
the detection unit is disposed to correspond to a central portion of the side face covering portion.

16. The tactile sensor of claim 1, wherein:
the detection unit includes a side face detection unit and an end face detection unit.

17. The tactile sensor of claim 1, wherein:
the detection unit detects the force applied to the cover as electrical changes and transmits the detected electrical changes to a controller via a harness.

18. A tactile sensor comprising:
a cover that is provided so as to cover at least part of a base portion;
a detection unit that is disposed between the cover and the base portion and detects force applied to the cover; and
a limiting structure that limits inclination of the cover with respect to the base portion,
wherein the cover has a side face covering portion that is disposed along a base portion side face of the base portion and an end face covering portion that extends from the side face covering portion and is disposed along a base portion end face of the base portion,
wherein the detection unit is disposed between the base portion side face and the side face covering portion and between the base portion end face and the end face covering portion, and
wherein the limiting structure comprises a stopper that limits movement of the cover in a direction toward the base portion.

19. A robot hand comprising:
a tactile sensor;
an opposing member that is disposed opposing the tactile sensor and grips an object between itself and the tactile sensor,
wherein the tactile sensor comprises:
a cover that is provided so as to cover at least part of a base portion;
a detection unit that is disposed between the cover and the base portion and detects force applied to the cover; and
a limiting structure that limits inclination of the cover with respect to the base portion.

* * * * *